US006960701B2

(12) United States Patent
Morrissey

(10) Patent No.: US 6,960,701 B2
(45) Date of Patent: Nov. 1, 2005

(54) NEUTRALIZATION OF VESICANTS AND RELATED COMPOUNDS

(75) Inventor: Kevin M. Morrissey, Stevensville, MD (US)

(73) Assignee: EAI Corporation, Abingdon, MD (US)

( * ) Notice: Subject to any disclaimer, the term of this patent is extended or adjusted under 35 U.S.C. 154(b) by 280 days.

(21) Appl. No.: 10/145,213

(22) Filed: May 14, 2002

(65) Prior Publication Data

US 2003/0009074 A1 Jan. 9, 2003

Related U.S. Application Data

(60) Provisional application No. 60/291,611, filed on May 18, 2001.

(51) Int. Cl.[7] ............................ A62D 3/00; C01B 15/01

(52) U.S. Cl. ................... 588/313; 252/186.28; 588/299

(58) Field of Search ................................ 588/200, 313, 588/299; 252/186.28

(56) References Cited

U.S. PATENT DOCUMENTS 5,710,358 A * 1/1998 Yang et al. ................. 588/317
6,455,751 B1 * 9/2002 Hoffman et al. ............ 588/320
6,569,353 B1 * 5/2003 Giletto et al. .......... 252/186.28

FOREIGN PATENT DOCUMENTS

DE 4442226 A1 * 6/1995 ............ A62D/3/00

* cited by examiner

*Primary Examiner*—Stanley S. Silverman
*Assistant Examiner*—Jonas N. Strickland
(74) *Attorney, Agent, or Firm*—Roland H. Shubert

(57) ABSTRACT

A process for the destruction of vesicants, nerve agents, and related chemical compounds is described. Blister-type chemical agents such as lewisite and mustards, as well as G or V Class nerve agents and phosphorus-containing pesticides, are reacted with a neutralent solution of a persulfate, preferably potassium peroxymonosulfate, and a peroxide, preferably hydrogen peroxide, at temperatures ranging from ambient to boiling for a time sufficient to reduce the residual agent concentration to levels acceptable for disposal in a routine manner.

12 Claims, 3 Drawing Sheets

NEUTRALIZATION OF VESICANTS AND RELATED COMPOUNDS

This application claims benefit of Provisional Ser. No. 60/291,611 filed May 18, 2001.

The U.S. Government has a paid-up license in this invention and the right in limited circumstances to require the patent owner to license others on reasonable terms as provided for by the terms of Contract No. DAAM 01-97-D-0005 awarded by the Department of the Army.

BACKGROUND OF THE INVENTION

1. Technical Field

This invention relates to methods for neutralizing vesicant agents and related chemical compounds.

More specifically, this invention relates to methods for neutralizing chemical agents, including G and V Class nerve agents, (and their binary components DF and QL) and especially such specific agents as lewisite, the mustard agents, and mixtures of lewisite and mustards, (and the arsenicals DA, DC and DM) to obtain a reaction product that may be transported and disposed of as a hazardous waste rather than as a chemical weapon.

2. Description of Related Art

Stocks of toxic chemical weapons left over from previous military conflicts exist here in the United States and at various other locations around the world. Those stocks include in particular large quantities of blister agents such as lewisite and the mustard agents. There are ongoing programs to dispose of those materials by means of incineration or by chemical destruction.

A number of techniques have been developed for the decontamination of materials and personnel that have been exposed to chemical agents. Those techniques include the use of a solvent, such as acetone, to wash the agent from the contaminated objects and the use of certain chemicals or mixtures of chemicals to react with and destroy the contaminant chemical agent. Examples of decontaminating chemicals that have been used in the past include calcium hypochlorite, chlorinated lime, hydrogen peroxide, and other oxidizing reagents. It is also common to use mixtures of chemicals as decontaminating agents, for example, mixtures of diethylenetriamine, sodium hydroxide and ethylene glycol monomethyl ether.

A method to detoxify the nerve agent VX and other phosphonothiolates as well as phosphonothioic acids is described in a recent patent to Yang et al, U.S. Pat. No. 5,710,358. A peroxymonopersulfate such as potassium peroxymonpersulfate, suitably a commercially available form of that compound that is sold under the trademark Oxone®, is reacted with the agent to oxidize it and convert it into less toxic products.

It is also known in the literature that lewisite and mustard agents can be neutralized or destroyed through reaction with a number of different reactant chemicals. Those reactant chemicals include amino-alcohols, persulfates, peroxy-acids, peroxides, halogenated hydantoins, and hypochlorites. Each known reactant chemical system presents a different set of advantages and disadvantages, and none provides a reasonably satisfactory method for the destruction and disposal of those toxic agents. In fact, some reactant chemicals produce products that are themselves so toxic as to require disposal as a chemical agent. This invention provides a process that alleviates and overcomes the problems and deficiencies inherent in the known prior art practices, and so constitutes a significant advance in the art.

SUMMARY OF THE INVENTION

Vesicants and chemical warfare agents such as the G and V Class nerve agents, and including in particular lewisite and mustard agents, are reacted with a neutralent solution that contains effective amounts of a persulfate, preferably potassium peroxymonopersulfate, and a peroxide, preferably hydrogen peroxide, under conditions whereat concentrations of toxic agents in the reactant product are reduced to a level at which the reactant product can be transported and disposed of as a hazardous waste rather than as a chemical weapon.

It is therefore an object of this invention to provide a practical system for the neutralization and destruction of chemical agents.

It is a further object of this invention to provide a neutralent composition that reacts with and destroys chemical agents without the formation of undesirable toxic reaction products.

Other objects and advantages of this invention will become evident from the following description of preferred embodiments of the invention.

DESCRIPTION OF PREFERRED EMBODIMENTS OF THE INVENTION

Figure 1:
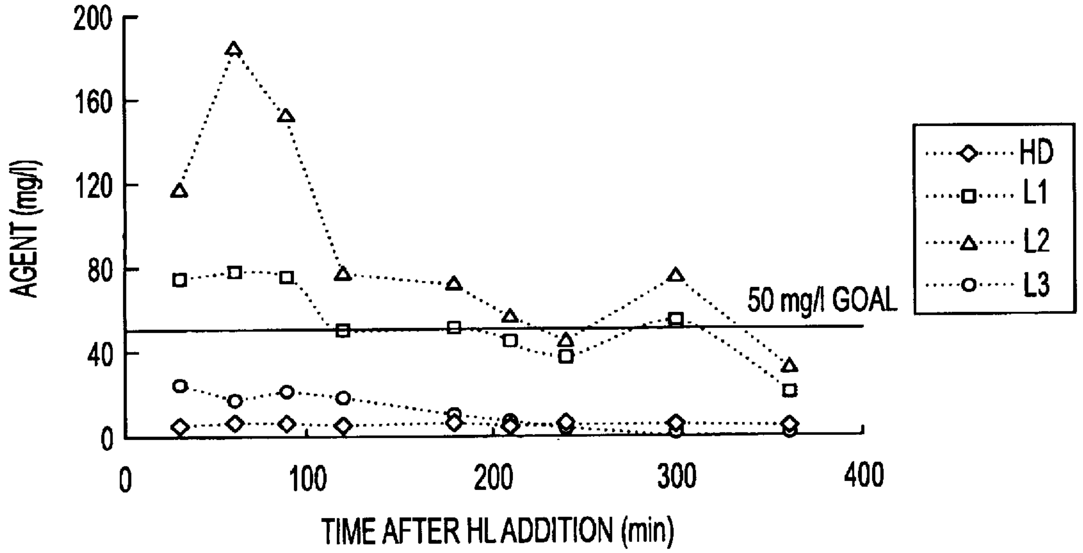
FIG. 1 is a plot of results obtained in the neutralization of a mixture of lewisite and mustard agents using the neutralent system of this invention at a volume ratio of 1:10 agent to neutralent.

It has been found that a variety of chemical agents that are classified as Schedule 1 agents (the most lethal or toxic) under the Chemical Weapons Convention can be chemically neutralized or destroyed, without the formation of other Schedule 1 agents as reaction products. That result is achieved in an economical fashion by reacting the agent with an aqueous solution that contains a persulfate and a peroxide. A mixture of potassium peroxymonosulfate and hydrogen peroxide produces excellent results, and that reagent mixture is presently preferred.

In order for it to be of practical value, a process for neutralizing or destroying chemical agents must be sufficiently reactive toward those agents to reduce the agent concentration in the reaction product to a level below 50 ppm, and desirably to a level of around 1 ppm or less, within a reasonable time frame. In addition, it is desirable that the reagents used be non-flammable, relatively non-toxic, reasonably stable, compatible with existing reactor systems, and be commercially available in bulk. The neutralent system of this invention meets those criteria.

It is desirable, and in a practical sense necessary, in the chemical destruction of stockpiles of chemical agents to reduce the residual concentration of agents in the waste stream produced by the reaction to a level whereat that waste stream may be routinely transported and conveniently disposed of. Under present guidelines, that requires the residual agent concentration to be below 50 ppm. Residual levels below 50 ppm allow the waste stream produced in the neutralization process to be transported and disposed of as a hazardous waste rather than as a chemical weapon.

In an exemplary and preferred embodiment of the process of this invention, chemical agents are neutralized in batch fashion in a heated, stirred reactor by adding the chemical agent to an aqueous neutralent solution of potassium peroxymonosulfate, $KHSO_5$, and hydrogen peroxide. Those two reagents in combination appear to act synergistically or catalytically to produce a result in the oxidation of chemical agents that is greater than is obtained through use of the reagents individually. Potassium peroxymonosulfate is commercially available as a relatively stable formulation that is sold by DuPont under the trademark Oxone®, and it is convenient to use the reagent in that form. Oxone® comprises a triple salt with the formula of $KHSO_5.KHSO_4.K_2SO_4$, in which the potassium peroxymonosulfate makes up approximately 43% of the total weight. Concentration of potassium peroxymonosulfate, as Oxone®, in the neutralent solution may range broadly from about 5% by weight to saturation, and a preferred concentration ranges from 10% to 25% by weight. Best results have been found with a hydrogen peroxide concentration in the neutralent solution that is roughly the same as that of the Oxone®, or generally in the range of 10% to 25% by weight. The neutralent solution may also contain a water soluble, co-solvent, such as an alcohol, displacing a portion of the water. Preferred co-solvents include 2-propanol and 1-methyl-2-pyrrolodinone in an amount up to 15% of the neutralent solution by volume.

It is preferred that the ratio of agent to neutralent be as low as possible, consistent with obtaining essentially complete destruction of the agent within a reasonable reaction time, so as to minimize the quantity of waste solution that is produced. That ratio will, of course, be dependent to some extent upon the concentration of reactant chemicals in the neutralent solution. It has been found that, in most instances, it is necessary to use an agent:neutralent volume ratio of at least about 1:10 in order to reduce the concentration of residual agent in the waste solution to a level below 50 ppm. An agent:neutralent volume ratio of about 1:50 has been found to consistently reduce the concentration of residual agent in the waste solution to a level of about 1 ppm, or even less. No practical benefit has been found in increasing the agent:neutralent volume ratio beyond about 1:50.

Reaction temperature is not critical, and the process may conveniently be carried out over a temperature range from ambient or below to about the boiling point of the neutralent solution. Preferred reaction temperatures range from about 40° C. to about 90° C. Reaction times are somewhat dependent upon temperature, the agent being neutralized, and the concentration of reactant chemicals in the neutralent solution, but generally are in the range of two to ten hours, and typically about three to six hours.

As has been set out before, it is known in the art to use strong oxidants for the decontamination of objects exposed to chemical agents and to destroy aged or redundant stocks of the agents. A number of the most promising neutralent systems described in the literature were evaluated for their effectiveness in the neutralization of the blister agent HL, which is a mustard-lewisite mix. The particular agent mixture used for these tests was a 45:45:10 volume ratio of HD:L1:L2. Another agent, designated L3, was present as an impurity in the L2. Agent HD, commonly referred to as distilled mustard, is bis(2-chloroethyl)sulfide. It is classified as a Schedule 1 agent. Lewisite, commonly designated agent L or L1, is by chemical name 2-chlorovinyldichloroarsine. It is also a Schedule 1 agent. Two closely related compounds, designated L2 and L3, are typically associated with L1. Agent L2 by chemical name is bis(2-chlorovinyl) chloroarsine, and L3 by chemical name is tris(2-chlorovinyl) arsine. Both L2 and L3 are classified as Schedule 1 agents under the Chemical Weapons Convention.

The particular oxidants that were identified in the literature as being useful in the neutralization or destruction of chemical agents included monoethanolamine (MEA), zinc oxide (ZnO), sodium persulfate (SPS), magnesium monoperoxyperphthalate (MMPP), sodium percarbonate (SPC), hydrogen peroxide (HP), dichlorodimethylhydantoin (DCDMH), and calcium hypochlorite (High Test Hypochlorite—HTH). Each of those prior art oxidants were tested to determine their efficacy in neutralizing chemical agents in the manner described in the following example.

EXAMPLE 1

A solution of each of the oxidants listed above was reacted with the 45:45:10 agent mixture that was previously characterized. The ratio of agent to neutralizing solution was set at 1:50, and the reaction was run for 60 minutes at a temperature of 40° C. The reactant solution was analyzed at the end of each run and the results were evaluated. Analysis was by gas chromatography with a mass spectrometer as the detector. The results of the tests were evaluated and the following conclusions were reached.

MEA tended to neutralize either HD or L1, but not both at the same time. It showed almost no efficacy against L2 and L3. Further, the reaction of L1 with MEA had previously been found to result in the slow release of acetylene from the neutralent which would lead to safety problems during waste storage and processing.

Zinc oxide, ZnO, was not effective against any of the agents.

SPS was effective in the neutralization of HD, L1, and L2. Agent L3 was not effectively neutralized, and some additional L3 appeared to be formed during the reaction.

MMPP showed good efficacy for HD, L1, and L2, but was ineffective toward L3 and caused the formation of additional L3 during the reaction.

SPC effectively neutralized HD, L1 and L2, but also caused the formation of additional L3 during the reaction. Additionally, the reagent tended to be a slurry that was difficult to pump.

HP was effective in the neutralization of HD, L1, and L2, but was not effective toward L3.

DCDMH was effective in neutralizing HD, L1, and L2, and was somewhat less effective against L3. A major drawback to this reagent was considered to be its very low (~0.1%) solubility in water.

HTH showed good efficacy for HD, L1, and L2 in one of the solvent systems evaluated, but it was not effective in neutralizing L3. Further, the reagent was in the form of a slurry that was difficult to pump.

As may be appreciated from the test data that is summarized in this example, in most cases the reaction product that is obtained from the neutralization of lewisite and mustard agents using many of the prior art neutralents contains significant amounts of L3. That L3 content makes the waste from the neutralization reaction subject to the same restrictions concerning transport and disposal that are imposed upon chemical weapons in general, thus negating much of the usefulness of the process.

EXAMPLE 2

An experiment was conducted to compare the efficacy of potassium peroxymonosulfate, hydrogen peroxide, and mixtures of the two. A sample of HL was prepared by mixing together HD, L1, L2, and L3 in a volume ratio of 500:375:75:50. Duplicate samples of this HL were reacted with three different reagents, reagent 1 being a 22% solution of Oxone®, reagent 2 being a 15% solution of hydrogen peroxide, and reagent 3 being a mixture of 15% Oxone® and 15% hydrogen peroxide. All of the experimental tests were conducted at an agent to reagent ratio of 1:25 for three hours at 90° C. At the end of that time the reaction mix was analyzed to determine the concentration of residual agents using external calibration curves established for each agent. The results that were obtained are set out in the following table.

| Reagent | Residual Agent in Neutralent (mg/l) | | | |
|---|---|---|---|---|
| Composition | HD | L1 | L2 | L3 |
| 22% Oxone ® | 160 | 211 | 217 | 1,530 |
| 15% $H_2O_2$ | 1.84 | 12.8 | 161 | 1,020 |
| 15% Oxone ® + 15% $H_2O_2$ | 0.56 | 11.5 | 30.6 | 36.3 |

When Oxone® was used alone as the neutralent, the residual concentrations of all four agents remained unacceptably high. Hydrogen peroxide used alone performed much better than did Oxone® in detoxifying HD, L1, and L2, but left an unacceptably high residual concentration of L3. The combination of the two reagents was effective against all four agents.

EXAMPLE 3

A feedstock comprising an HL agent was analyzed. Its composition was determined to be 45.7 wt % L1, 39.8 wt % HD, 1.90 wt % $AsCl_3$, and 0.525 wt % compound Q. Q is an impurity occurring in mustard and is a Schedule 1 agent Those components accounted for 96.8 wt % of the HL. A number of other organic chemicals were identified, but none were present in a concentration greater than 0.1 wt %. Total arsenic was the major metal at 21.2 wt %. Total iron was next highest at a level of 0.224 wt %. Antimony at a concentration of 279 mg/kg and mercury at a concentration of 167 mg/kg were also found. Those last two metals are believed to be catalyst residues from the synthesis of the lewisite.

The HL feedstock was reacted with a neutralent solution comprising 17.5 wt % stabilized potassium peroxymonosulfate (Oxone®), 17.5 wt % hydrogen peroxide, with the balance water. The reaction was conducted in a stainless steel reaction calorimeter, using 1 liter of neutralent solution and about 100 ml (150 g) of the HL agent for an agent:neutralent volume ratio of about 1:10. The reactor was blanketed with nitrogen and stirred at 500 rpm. Initial reactor temperature was 25° C. and that temperature was maintained for the first 30 minutes of the reaction, and was thereafter increased to 75° C. at the rate of 0.8° C./min. The feed rate of the HL agent was 15 g/min. Ten samples of the reaction mix were collected for analysis at 30-minute intervals, the first sample collected at 30 minutes after HL feed to the reactor was complete and the last sample collected at 360 minutes after completion of HL feed.

Each sample was analyzed for HD, L1, L2, and L3 by means of gas chromatography using a mass spectrometer as a detector. The results obtained are graphically presented in FIG. 1. At the 360 minute point, all four of the agents of primary concern showed a residual concentration below the goal level of 50 mg/l. However, the total residual concentration of the four agents exceeded the goal level at that time point and throughout the course of the reaction.

EXAMPLE 4

Figure 2:
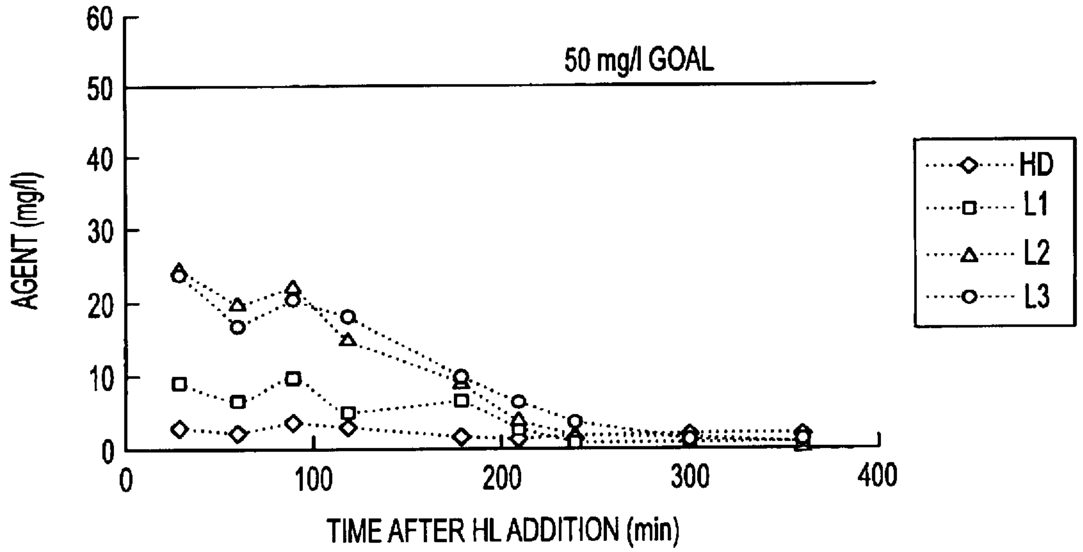
FIG. 2 is a plot of results obtained in the neutralization of a mixture of lewisite and mustard agents using the neutralent system of this invention at a volume ratio of 1:50 agent to neutralent.

The reaction and analysis procedure of Example 3 was repeated, changing only the agent:neutralent ratio. In this example, 20 ml (approximately 30 g) of the HL feedstock was added to 1 liter of neutralent solution to obtain an agent:neutralent volume ratio of approximately 1:50. Sample collection and analysis was as described in Example 3, and the results obtained are graphically presented in FIG. 2. As is evident from that Figure, the concentration of each of the four agents of primary concern, HD, L1, L2, and L3, was below the goal level of 50 mg/l at the 30-minute mark, and was approaching 1 mg/l at the 300-minute mark.

EXAMPLE 5

Figure 3:
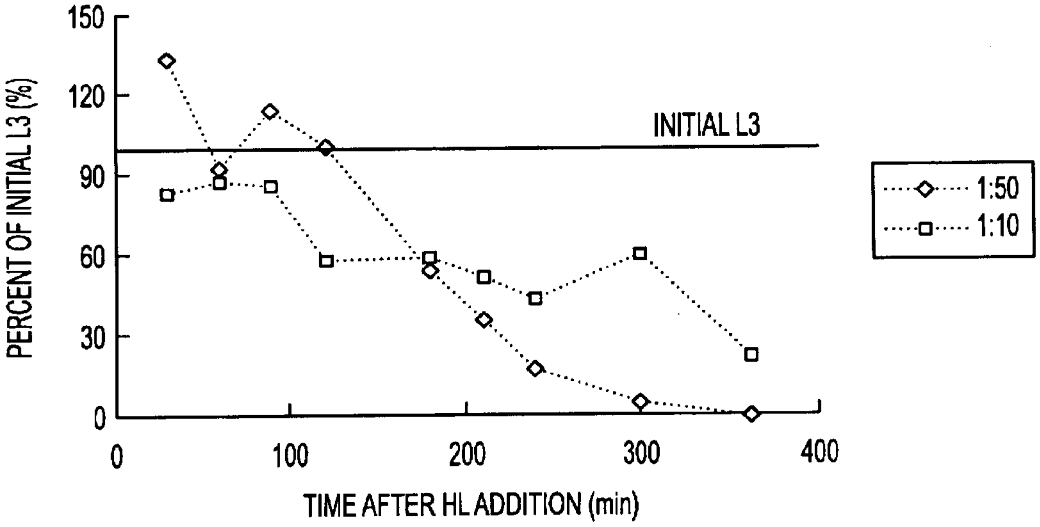
FIG. 3 is a plot showing the residual concentration of agent L3 as a function of reaction time at volume ratios of 1:10 and 1:50 agent to neutralent.

As has been noted previously, many of the chemical neutralization systems of the prior art produce L3 as a reaction product. The analytical results obtained in Examples 3 and 4 were examined to determine the extent of that phenomenon occurring using the neutralent solution of this invention. The concentration of L3 as a percent of its initial concentration was plotted against time, and the results are presented in FIG. 3. As may be inferred from those data, there appears to be some early formation of L3 at the higher (1:50) agent:neutralent volume ratio, but that trend is quickly reversed with the concentration of L3 approaching zero at the 360 minute mark.

EXAMPLE 6

A number of validation runs were performed in a stainless steel reaction calorimeter using the same HL feedstock and neutralent solution as were used in Examples 3 and 4. A first set of three runs was conducted using one liter of neutralent and 20 ml of HL for an agent:neutralent volume ratio of 1:50, and a second set of three runs was conducted using one liter of neutralent and 100 ml of HL for an agent:neutralent volume ratio of 1:10. In each run, the reactor was blanketed with nitrogen, stirred at 500 rpm, held at 40° C. until 30 minutes after conclusion of HL feed, then ramped to 75° C. at a rate of 1° C./min. The HL feed rate was 5 g/minute.

Figure 4:
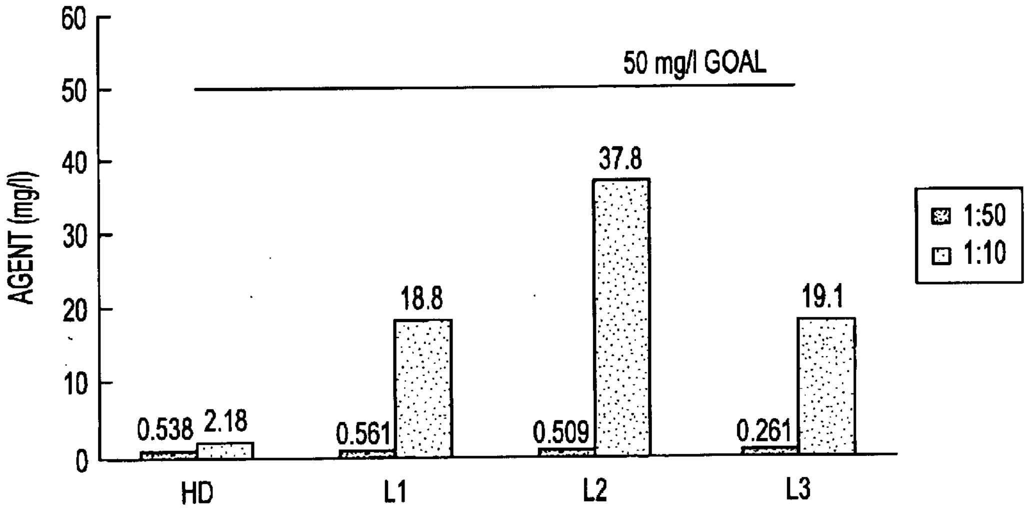
FIG. 4 is a plot showing residual chemical agent and toxic impurities after reaction with the neutralent system of this invention at volume ratios of 1:10 and 1:50 agent to neutralent.

The reactor was drained after 180 minutes at 75° C. and the reaction product was immediately prepared for analysis to determine the residual concentration of HD, L1, L3, and L3. Analytical results obtained are presented as bar graphs in FIG. 4. In all cases, the left bar of each pair represents the residual concentration of the chemical agent at an agent:neutralent volume ratio of 1:50, while the right bar of each pair is the residual concentration of the chemical agent at an agent:neutralent volume ratio of 1:10. As shown in the Figure, the residual concentration of each of the four chemical agents was less than 1 mg/l for those runs performed at a 1:50 ratio, and the residual concentration of each of the four agents was well less than 50 mg/l for those runs performed at a 1:10 ratio.

EXAMPLE 7

Figure 5:
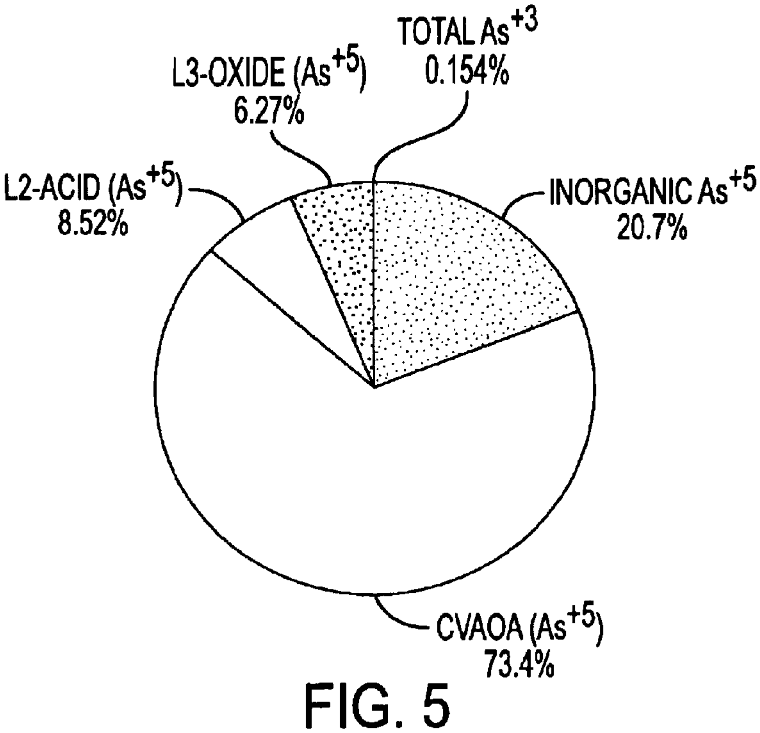
FIG. 5 is a pie graph showing the distribution of arsenic in the reaction products after treatment with the neutralent system of this invention at a volume ratio of 1:10 agent to neutralent.
Figure 6:
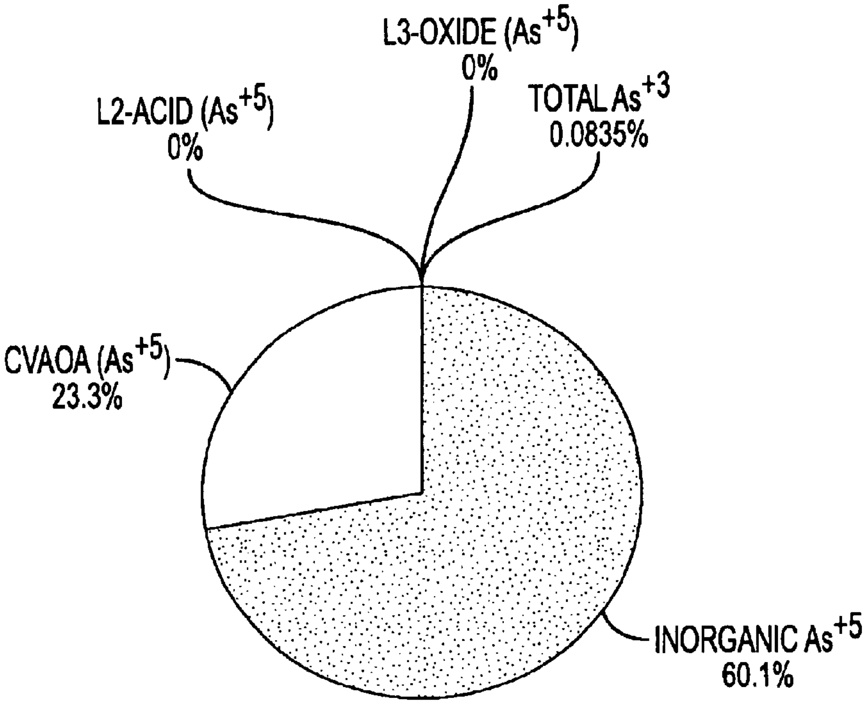
FIG. 6 is a pie graph showing the distribution of arsenic in the reaction products after treatment with the neutralent system of this invention at a volume ratio of 1:50 agent to neutralent.

The distribution of arsenic compounds in the reaction product obtained from the two sets of runs described in Example 6 was determined, and the results obtained are displayed in the pie graphs presented as FIGS. 5 and 6. FIG. 5 displays the arsenic distribution found in that set of runs made at an agent:neutralent volume ratio of 1:10. Nearly all of the arsenic had been oxidized from the $As^{+3}$ state to the least toxic $As^{+5}$ state, and about one-fifth of the total arsenic comprised inorganic arsenic oxide. The inorganic arsenic oxide is the most desirable reaction product as it is the form that is the least toxic and the most easily disposed of. Total reported arsenic compounds add to more than 100% because of analytical uncertainties in determining the precise compound form of the organic arsenic compounds resulting from the reaction.

FIG. 6 displays the arsenic distribution found in that set of runs made at an agent:neutralent volume ratio of 1:50. Only a trace of $As^{+3}$ remained. Most of the $As^{+5}$ was present as the inorganic oxide. Here also, the total reported arsenic compound did not total 100% and that result is attributed to analytical uncertainties in determining the compound form of the reported arsenic compounds. The trend, however, was quite clear. Arsenic was more completely oxidized and more was converted to the inorganic oxide as the agent:neutralent ratio increased from 1:10 to 1:50.

EXAMPLE 8

A number of micro-scale reactions were performed to determine the applicability of the neutralent solution of this invention for the chemical destruction of nerve agents. Samples of Tabun (Agent GA), Soman (Agent GD), and Agent VX were reacted with the neutralent solution of Example 3. The reaction was performed at an agent:neutralent ratio of 1:25 for 3 hours at 65° C. Bulk analysis by $^{31}$P-NMR revealed that the agent acid, MPA, and inorganic phosphate were the principal reaction products. The distribution found was approximately 50% agent acid, 40% MPA, and 10% inorganic phosphate. The reaction product was homogeneous, with no visible solids or phase separation. Longer reaction times and higher temperatures drives the reaction toward a higher concentration of inorganic phosphate in the reaction product.

All three of the tested nerve agents comprise organophosphates. Agent GA, by chemical name, is ethyl N,N-dimethylphosphoroamidocyanidate; Agent GD is pinacolyl methyl phosphonofluoridate; and Agent VX is O-ethyl-S-(2-isopropylaminoethyl)methylphosphonothiolate. On the basis of these tests and upon consideration of the chemical similarities it was concluded that the inventive process will be useful for the destruction of other phosphorus-containing agents and pesticides as well as those tested.

The embodiments of this invention that have been described in the foregoing specification are those that are presently preferred and are not to be considered limiting and many modifications and variations of the described invention are possible in light of the above teachings. It is to be understood, therefore, that the invention is limited only by the scope of the appended claims.

I claim:

1. A process for the destruction of chemical agents selected from the group consisting of vesicants, nerve agents, and phosphorus-containing pesticides comprising contacting the chemical agent with an aqueous neutralent solution that contains effective amounts of hydrogen peroxide and more than 5% by weight of the triple salt $KHSO_5.KHSO_4.K_2SO_4$ for a time sufficient to reduce the concentration of chemical agent in the reaction product to level below 50 mg/I.

2. The process of claim 1 wherein said neutralent solution contains from 10% to 25% by weight of said triple salt, from 10% to 25% by weight of hydrogen peroxide, and up to 60% by weight of water.

3. The process of claim 2 wherein said neutralent solution contains a water-soluble, co-solvent in an amount up to 15% of the neutralent solution by volume.

4. The process of claim 3 wherein said co-solvent is 2-propanol.

5. The process of claim 3 wherein said co-solvent is 1-methyl-2-pyrrolodinone.

6. The process of claim 2 wherein the agent:neutralent volume ratio is in the range of a out 1:10 to 1:50.

7. The process of claim 6 wherein paid reaction is conducted at a temperature ranging from ambient to the boiling point of the neutralent solution for a time ranging from 2 to 10 hours.

8. The process of claim 7 wherein said chemical agent is a G or V Class nerve agent.

9. The process of claim 7 wherein said chemical agent is a phosphorus-containing pesticide.

10. The process of claim 7 wherein said chemical agent is a vesicant that is selected from the group consisting of lewisite, mustard agents, and mixtures thereof, and wherein said neutralent solution contains approximately equal amounts of said triple salt and hydrogen peroxide.

11. The process of claim 10 wherein said reaction temperature is in the range of about 40° to about 90° C. and the reaction time is in the range of about 3 to 6 hours.

12. The process of claim 10 wherein said neutralent solution contains about 17.5 wt % of said triple salt and about 17.5 wt % hydrogen peroxide and wherein said agent:neutralent volume ration is about 1:50.

* * * * *